Oct. 26, 1965  R. W. EARL, JR  3,213,701
LINEAR ACTUATOR
Filed Aug. 1, 1963  2 Sheets-Sheet 2

INVENTOR:
ROBERT W. EARL, JR.
BY
*J. Wayne Rodgers*
Attorney.

United States Patent Office 3,213,701
Patented Oct. 26, 1965

3,213,701
LINEAR ACTUATOR
Robert W. Earl, Jr., Palos Verdes Estates, Calif., assignor to The Garrett Corporation, Los Angeles, Calif., a corporation of California
Filed Aug. 1, 1963, Ser. No. 299,272
14 Claims. (Cl. 74—424.8)

The present invention relates generally to linear actuators, and more especially to improve stop means designed to reduce or eliminate a jam which may bind relatively moving parts of an actuator at the extreme limits of their relative movement.

Linear actuators are used in many different types of equipment to achieve remote control of a movable portion of the machine. For example, linear actuators are commonly used to effect control of movable members, for example to open and close doors or valves, and perform other similar functions. In some designs of linear actuators with leadscrews there is a jamming or binding of two relatively movable members at either or both limits of movement. As a consequence of such a jam, it is not unusual that the motor, upon reversal, is in capable of both reducing the jam and of accelerating the load. This condition is inherent in a design using an irreversible screw thread interconnecting two relatively movable members causing binding or jamming at the surfaces of the threads which slide relative to each other as the threaded members undergo both rotary and longitudinal relative movement.

When two relatively movable members of the actuator are extended or retracted to an extreme limit of movement and are stopped by mutual engagement of stop members, a quantity of kinetic energy is dissipated as heat, created by the jam, at the surfaces of the engaging parts. To recover usefully a portion at least of the energy of a jam, actuators have been designed with a resilient stress member that is deformed upon engagement with a relatively moving member at each end of a stroke in order to store therein a portion of the kinetic energy of the moving parts. The resilient stress member may be a rod frictionally engaged at one end in a manner to twist the rod and thereby store energy in spring action. Upon reverse movement, the stress in the rod is released, the stored energy thereby released being available to assist the motor to reduce the jam and accelerate the load.

An example of such an actuator is that disclosed in U.S. Patent No. 2,658,407 issued November 10, 1953 to James E. Chapman et al. This design employs a stress member having flat radial surfaces engaged frictionally with other flat, radial surfaces; and it will be seen that the present invention is in the nature of an improvement in that structure. Engaging frictional surfaces of planar design normal to the axis of rotation are sound in theory but may develop some unexpected difficulties in operation. The high unit loads in bearing encountered in a device of this kind cause wear and galling at the areas of contact; but more importantly, between the frictionally engaging surfaces there may be excessive slippage after engagement which reduces the torsion that can be imparted to the stress member. These surfaces may not always remain parallel to each other because of deformation of the stress member in bending, with various unfavorable results. The bearing surfaces are then at a slight angle so that only portions of the surfaces engage each other. This condition promotes wear and slippage between the surfaces. Also, the axial loading on the rod becomes eccentric. The eccentricity produces an uneven distribution of axial loading on the rod that creates very high unit stresses in localized portions of the rod and may result in permanent deformation, especially under compression loading. As a result, the performance of the actuator may deteriorate even if there is not a complete failure.

Hence it becomes a general object of the present invention to provide in a linear actuator an improved design of means for converting at least a part of the kinetic energy of a jam into potential energy available to assist in unjamming the parts.

It is a further object of the invention to provide a novel and improved design for the frictionally engaging surfaces, including the surface on the stress member, which insures improved frictional engagement between the surfaces.

A more specific object of the invention is to provide an improved design for the engaging friction surfaces that minimizes relative slippage and achieves maximum torsional movement of the stress member.

How the above objects of the present invention, as well as others not specifically referred to herein, are achieved, will be better understood by reference to the following description and to the annexed drawing, in which.

Figure 1:
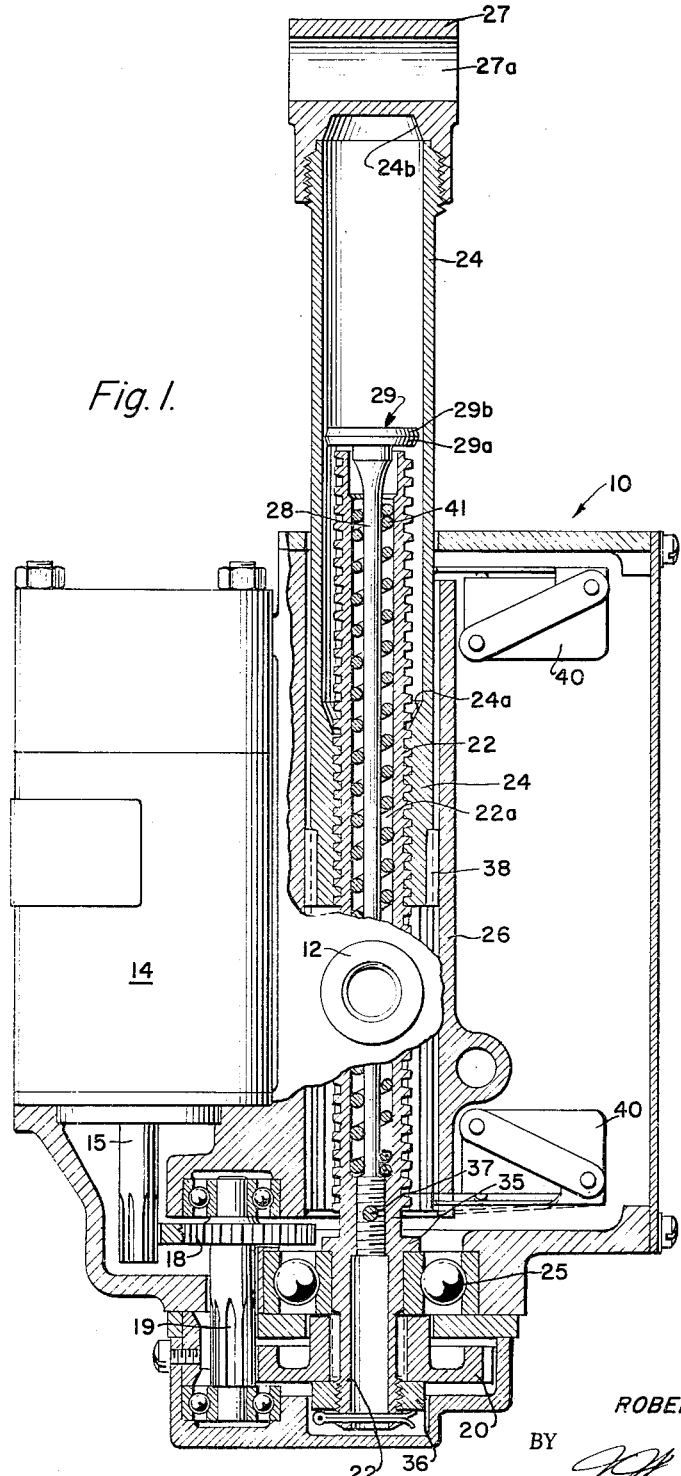
FIG. 1 is a longitudinal median section through a linear actuator embodying the present invention.

Referring to the drawing, it will be seen that the actuator indicated generally at 10 comprises housing 11 which is provided on opposite sides with a pair of axially aligned mounting trunnion bosses 12 by means of which the actuator housing may be pivotally attached to any suitable structure to swing about an axis established by the trunnions 12. Mounted upon the actuator housing is electrical drive motor 14 which drives the actuator mechanism from an output shaft 15. Power from motor output shaft 15 is transmitted through a speed reducing gear train 18, which may be of any suitable type, to pinion 19 which meshes with spur gear 20 keyed or otherwise non-rotatably attached to one end of jackscrew shaft 22 which is one of the two basic relatively movable members of the actuator.

These two relatively movable members are shaft 22 and sleeve 24 which surrounds and is concentric with shaft 22. Shaft 22 is externally screw-threaded and is rotatably mounted in the housing by any suitable means, including bearings 25. Suitable means, including shoulder 35 and nut 36 hold the shaft against longitudinal movement under normal working conditions. Sleeve 24 is internally threaded, the threads on these two members meshing whereby rotational movement of shaft 22 produces longitudinal translational movement of sleeve 24. In this respect, sleeve 24 is comparable to a threaded nut which moves axially along a lead screw as the latter rotates. Sleeve 24 is held against rotation, though free to move longitudinally, by a spline connection 38 comprising external keys on the sleeve which slide in longitudinal grooves inside a cylindrical barrel 26 of the actuator housing.

Sleeve 24 has on its outer end an eye fitting 27 by which the actuator is connected to the part or mechanism to be moved. A bolt or pin passing through the central eye 27a keeps the fitting and the attached sleeve 24 from turning about the axis of the sleeve, as shaft 22 rotates, thus producing longitudinal movement of the sleeve and attached fitting.

The jackscrew shaft 22 has an axial bore 22a extending throughout the length of the shaft. Within this bore is located stress member 28, which is a cylindrical rod of slightly smaller diameter than the shaft bore and is firmly secured at its inner end to shaft 25 in any suitable manner, for example by a thread connection locked by pin 37. The outer end of stress member 28 extends beyond the corresponding end of the shaft 22 where it is provided with an enlarged head 29. Head 29 of stress member 28 has a pair of oppositely inclined, frusto-conical external surfaces 29a and 29b around the periphery of the head.

As mentioned above, stress member 28 is firmly connected to shaft 22 which is one of the two relatively movable members of the actuator. The other relatively movable member, sleeve 24, carries a pair of frusto-conical friction faces 24a and 24b. These are interior surfaces and may be on an integral portion of sleeve 24, as is face 24a, or on elements attached to the sleeve as is face 24b. In some cases it may be desired to place one or both faces 24a and 24b on an annular insert, as is commonly done with valve seats. Both friction surfaces are shaped to match and be engageable with surfaces 29a and 29b respectively at the two extreme limits of movement of sleeve 24 with respect to shaft 22. To permit this, head 29 with its two friction surfaces 29a and 29b is disposed between the two travelling friction surfaces 24a and 24b.

The central included angle a of these frusto-conical faces is preferably about 40°. This angle has been found in practice to be very satisfactory in a typical size and design of actuator; and a change of perhaps 20° either way includes optimum angles for all the usual ranges of variables in actuator sizes and dimensions. Angles within the range 20°–60° have been tested and found satisfactory. From a functional standpoint, a small central angle is preferred for best results; but for various practical reasons an angle larger than the ideal minimum may be chosen.

Figure 2:
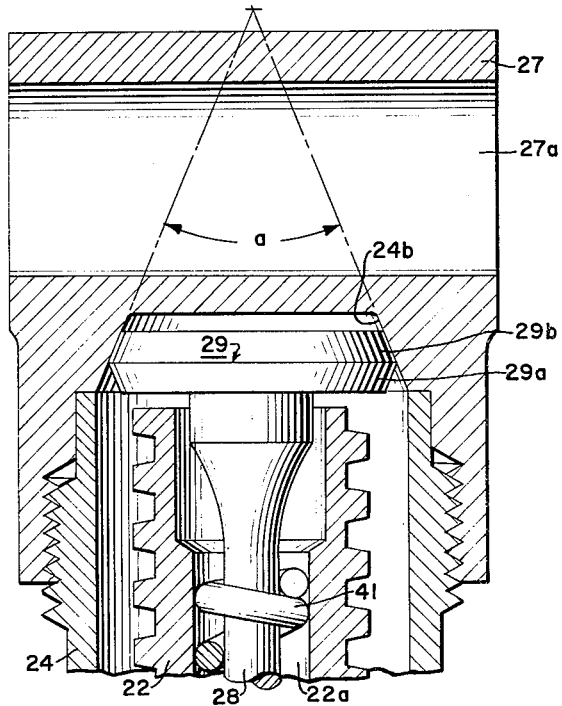
FIG. 2 is an enlarged fragmentary sectional view showing the friction surfaces engaged at one limit of movement.
Figure 3:
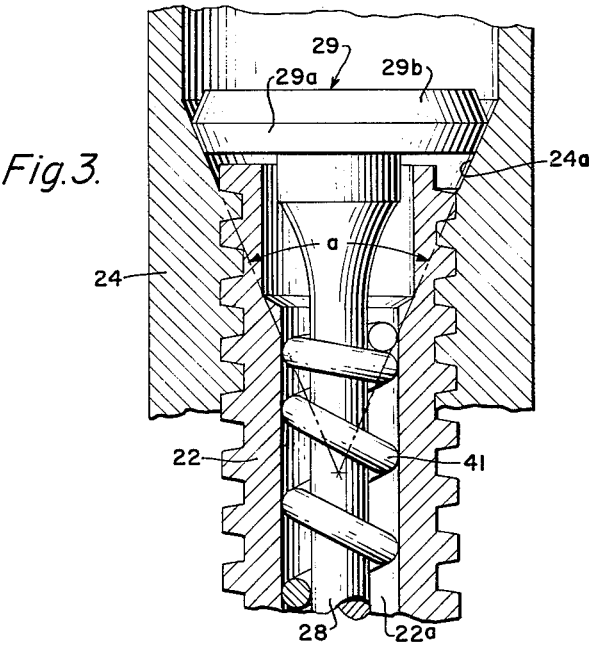
FIG. 3 is similar to FIG. 2 showing the frictional surfaces engaged at the other limit of relative movement.

Thus it will be apparent that when the sleeve is fully retracted to the inner or lower end of its range of movement, when viewed as in FIG. 1, the pair of matching frusto-conical surfaces 24b and 29b are engaged as in FIG. 2. Upon rotation of shaft 22 now, sleeve 24 is moved upwardly in FIG. 1 and ultimately reaches the fully extended position at the outer extreme of its range of movement. At this extreme, the extended sleeve brings the pair of matching surfaces 24a and 29a into engagement as shown in FIG. 3.

Engagement of the conical surfaces may occur under various conditions. The actuator illustrated includes a pair of travel limiting switches 40 in series with motor 14 and interrupting the power supply thereto when open. In the event of switch failure, or overtravel for any reason, a jam results, bringing the friction surfaces into contact as in FIG. 2 or 3. On the other hand, the power supply to motor 14 may be controlled only by a push-button switch manually operated and the limit switches omitted. The friction surfaces then come into contact, as described, at the end of travel in either direction as a normal and expected means of limiting the excursion of the sleeve.

When matching pairs of friction surfaces are in engagement, it will be apparent that torsional and axial or longitudinally directed stress is imposed upon stress member 28 and is transferred to the surrounding sleeve at the threaded and pinned connection 37.

When under compression, stress member 28 tends to buckle or deflect laterally in column action at locations between its ends, unless supported laterally at these locations. To provide such support, a wire or similar member 41 is wrapped around the stress member for at least a portion of the length of the stress member. The diameter of wire 41 is such that the annular space between rod 28 and the surrounding sleeve is substantially filled, thereby bracing the rod against the inner wall of the sleeve to resist lateral deflection of the rod when under compression. Member 41 is applied to the central portion of the stress member over preferably a major portion of its length. This axial stress is a compression stress when the sleeve is retracted as in FIG. 2 and a tension stress when the sleeve is extended as in FIG. 3. In both cases, the rotary motion of stress member 28 and its head 29 causes a torsional stress to be imposed on stress member 28.

Thus, it is evident that at either extreme of the range of relative movement of the two members 22 and 24, the moving parts come to rest with the torsion member under a stress which represents combined torsionally and longitudinally directed stresses in the rod. This combined stress represents storage of at least a part of the kinetic energy dissipated by forcing the head of the torsion member against the stop surfaces carried by sleeve 24. Stress is stored in the resilient rod until such time as motor 14 is energized again to drive the relatively movable shaft and sleeve in the opposite direction, at which time stored potential energy is released to assist the starting torque applicable by the motor to free the jammed parts and to accelerate the load to which eye fitting 27 is connected.

Of the stored stress only the torsional stress can be usefully recovered as torque assisting the motor. Hence, it is desired to minimize slippage at the matching frusto-conical surfaces to achieve the maximum angular deformation of the torsion member 28. This frusto-conical shape of the friction surfaces has been found to be highly effective in minimizing or eliminating slippage at these surfaces. For this purpose the central angle of these surfaces is, as a general principle, made as small as practical without producing a self-locking action that hinders prompt separation of the two surfaces.

Reduction in slippage is attributed to the angular relationship between the axis of the sleeve and the frusto-conical surfaces. Thus axial movement of surface 24b against head 29 creates a force normal to the matching surfaces that varies inversely with the sine of half the central angle and is therefore greater than the axial thrust. For a central angle of 40°, the force normal to the friction surfaces is about three times the axially directed component of the normal force. Since the resistance due to friction is a product of the normal force and the coefficient of friction, for a given pair of surfaces the resistance to turning head 29 increases directly in proportion to the force normal to surface 29a or 29b; and it is always greater than the frictional resistance between two surfaces in radial planes for the same axial thrust, assuming the same coefficient of friction. Hence the novel angular disposition of the frictionally engaging surfaces relative to the axis of the rotation produces a mechanical advantage not heretofore obtained.

It will be seen that the head of the stress member is self-centering or self-aligning with respect to the surfaces 24a and 24b. The head on the torsion member is located at the free end thereof where the stress member is able to deflect laterally upon engagement of either pair of matching frusto-conical surfaces to bring the engageable surfaces into concentric position with respect to each other. This is of great advantage since, if for any reason rod 28 is not perfectly straight, the head becomes centered by mutual engagement of the frusto-conical surfaces so that the load thereon is applied evenly around the periphery and axially of the rod. This eliminates eccentric loading of the rod and distributes the load evenly over the cross section of the rod, to obvious advantage when design loads are close to allowable.

Another advantage of this particular disposition of the mutually engageable frusto-conical surfaces is that the radius from the axis of rotation to the center of pressure of the engaged surfaces is increased to a maximum as compared with other designs for surfaces of equal area, thus increasing as far as possible, the moment arm of the torque applied to the stress member to store kinetic energy therein as torsional stresses.

From the foregoing description it will be evident that various changes can be made in the exemplary embodiment of the invention described without departing from the spirit and scope of the present invention. Accordingly, it is to be understood that the foregoing description is considered to be illustrative of, rather than limitative upon the present invention.

I claim:

1. A non-jamming stop for a linear actuator having a pair of cooperative members movable both rotationally and translationally to a limit of movement with respect to each other, means producing relative movement of said members, and a stress member secured to one of said relatively movable members, characterized by matching frusto-conical surfaces on the other of said movable members and on said stress member frictionally engageable in the vicinity of the limit of relative movement of the movable members to convert at least a portion of the energy of a jam into the potential energy of a torsional and longitudinal stress in said stress member.

2. A non-jamming stop as in claim 1 in which the stress member is free to deflect laterally at the location of the frusto-conical surface thereon whereby the two engaging frusto-conical surfaces can be brought into concentricity by mutual engagement.

3. A non-jamming stop as in claim 1 in which the central angle of the frusto-conical surface is between about 20° and about 60°.

4. A non-jamming stop as in claim 1 in which the central angle of the frusto-conical surfaces is substantially 40°.

5. A non-jamming stop as in claim 1 in which the stress member is inside a bore in the one of the relatively movable members to which it is attached and is wrapped for a portion of its length with a member substantially filling the space between the stress member and said one relatively movable member to brace the stress member against lateral deflection.

6. A non-jamming stop for a linear actuator having a pair of cooperative members movable both rotationally and translationally between two limits of movement with respect to each other, means producing relative movement of said members, and a stress member connected to one of the relatively movable members, characterized by matching pairs of frusto-conical friction surfaces on said one of the relatively movable members and on the stress member, the stress member having two oppositely inclined frusto-conical surfaces located between two spaced frusto-conical surfaces on said one of the relatively movable members so disposed that a frusto-conical surface on the stress member engages a matching frusto-conical surface on said one of the relatively movable members adjacent each of the limits of movement of the movable members to convert at each of said limits a portion of the energy of a jam into the potential energy of a torsional and longitudinal stress in said stress member.

7. A non-jamming stop as in claim 6 in which the stress member is free to deflect laterally at the location of the frusto-conical friction surfaces thereon whereby the friction surface on the stress member can be brought into concentricity with either of the friction surfaces on said one of the relatively movable members by engagement therewith.

8. A non-jamming stop as in claim 6 in which the central angle of the frusto-conical surfaces is between about 20° and about 60°.

9. A non-jamming stop as in claim 6 in which the central angle of the frusto-conical surfaces is substantially 40°.

10. A non-jamming stop as in claim 6 in which the stress member is inside a bore in the one of the relatively movable members to which it is attached; and which also includes a member wrapped around the stress member for a portion of its length and substantially filling the space between the stress member and said one relatively movable member to brace the stress member against lateral deflection.

11. An actuator comprising a pair of cooperative members movable relative to each other to a limit of movement including rotational movement, and a torsion stress member connected with one of said members and having a frusto-conical surface frictionally engageable with a matching frusto-conical surface on the other of said members in the vicinity of said limit of movement, said stress member being stressed in torsion by engagement of said surfaces at said limit of movement.

12. Mechanism comprising threaded screw and nut members engaging and rotationally movable relative to each other, said members having portions limiting said relative movement, one of said portions comprising a torsion stress means having a friction surface of frusto-conical shape, the other of said portions including a friction surface of matching frusto-conical shape slidably engaging the first mentioned friction surface at the limit of relative movement of the screw and nut members, the stress means being stressed in torsion by engagement of said friction surfaces at said limit of movement.

13. Mechanism as in claim 12 in which the frusto-conical surfaces are concentric with the axis of relative rotation of the screw and nut members.

14. Mechanism as in claim 12 in which the central angle of the frusto-conical surfaces is between about 20° and about 60°.

References Cited by the Examiner
UNITED STATES PATENTS
2,658,407    11/53    Chapman et al. _____ 74—424.8

DON A. WAITE, *Primary Examiner.*